US011756138B2

(12) United States Patent
Hunter et al.

(10) Patent No.: US 11,756,138 B2
(45) Date of Patent: Sep. 12, 2023

(54) SYSTEM AND METHOD FOR STORMWATER UTILITY MANAGEMENT

(71) Applicant: Morgan State University, Baltimore, MD (US)

(72) Inventors: James Hunter, Bowie, MD (US); Dong Hee Kang, Timonium, MD (US); Hye Jeong Lee, Timonium, MD (US)

(73) Assignee: MORGAN STATE UNIVERSITY, Baltimore, MD (US)

( * ) Notice: Subject to any disclaimer, the term of this patent is extended or adjusted under 35 U.S.C. 154(b) by 0 days.

(21) Appl. No.: 17/734,198

(22) Filed: May 2, 2022

(65) Prior Publication Data

US 2022/0261931 A1 Aug. 18, 2022

Related U.S. Application Data

(63) Continuation of application No. 15/966,150, filed on Apr. 30, 2018, now abandoned.

(60) Provisional application No. 62/491,476, filed on Apr. 28, 2017.

(51) Int. Cl.
*G06Q 50/06* (2012.01)
*G06Q 30/0283* (2023.01)
*G06Q 30/04* (2012.01)
*G06F 16/954* (2019.01)

(52) U.S. Cl.
CPC .......... *G06Q 50/06* (2013.01); *G06F 16/954* (2019.01); *G06Q 30/0283* (2013.01); *G06Q 30/04* (2013.01)

(58) Field of Classification Search
CPC ..... G06Q 50/06; G06Q 30/0283; G06Q 30/04

USPC ........................................................ 705/412
See application file for complete search history.

(56) References Cited

U.S. PATENT DOCUMENTS

| 6,868,391 B1* | 3/2005 | Hultgren | G06Q 20/02 |
| | | | 705/16 |
| 2006/0262963 A1* | 11/2006 | Navulur | G06V 20/13 |
| | | | 382/109 |
| 2016/0275633 A1* | 9/2016 | Gitt | G06Q 50/06 |

OTHER PUBLICATIONS

"Funding Stormwater Programs." Jan. 2008. EPA. 833-F-07-012. pp. 1-5. https://www.epa.gov/sites/production/files/2015-10/documents/region3_factsheet_funding_0.pdf. (Year: 2008).*
"Stormwater Utility Formation." Oct. 2014. City of Gladstone—FCS Group. p. 4. https://www.ci.gladstone.or.us/sites/default/files/fileattachments/public_works/page/4561/stormwater_utility_formation_report-10_10_14.pdf. (Year: 2014).*

(Continued)

*Primary Examiner* — Jeff Zimmerman
*Assistant Examiner* — Hunter A Molnar
(74) *Attorney, Agent, or Firm* — Whiteford, Taylor & Preston, LLP; Gregory M. Stone

(57) ABSTRACT

Disclosed is a system and method for stormwater utility management that aids stormwater utilities in establishing fees, abatements, and tradeable stormwater credits using publicly available parcel database information. A stormwater support services computer in communication with publicly available data stores of parcel information rapidly assesses and generates a per-parcel stormwater utility fee based on estimated size of impervious surfaces on a parcel. Through use of publicly available parcel information to generate an estimated size of impervious surfaces on a parcel, a stormwater utility fee based on level of service is implemented.

2 Claims, 9 Drawing Sheets

(56) References Cited

OTHER PUBLICATIONS

"An Ordinance." Charleston City Council. Jul. 3, 2010. https://web.archive.org/web/20100703021657/https://www.charlestoncounty.org/ordinances/1400-1499/1465%20Impose%20Stormwater%20Management%20Utility%20Fees.pdf. (Year: 2010).*

Hawkins, Richard. Asymptotic Determination of Runoff Curve Numbers From Data. Mar. 1993. Journal of Irrigation and Drainage Engineering. pp. 334-345. (Year: 1993).*

* cited by examiner

SYSTEM AND METHOD FOR STORMWATER UTILITY MANAGEMENT

CROSS REFERENCE TO RELATED APPLICATIONS

This application is a continuation of U.S. patent application Ser. No. 15/966,150 titled "System and Method for Stormwater Utility Management: filed Apr. 30, 2018, which is based upon and claims the benefit of U.S. Provisional Application No. 62/491,476 titled "Stormwater Utility Management System," filed with the United States Patent & Trademark Office on Apr. 28, 2017, the specification of which is incorporated herein by reference in its entirety.

FIELD OF THE INVENTION

This invention is directed to the automated determination of parcel impact on stormwater management, and more particularly to systems and methods for estimating parcel impact on stormwater management for purposes of determining stormwater utility fees based on level of service through use of publicly available parcel data.

BACKGROUND OF THE INVENTION

Mitigating the adverse impacts from wastewater and stormwater is critical to our nation's waters and watershed ecosystems. A 2013 report card by the American Society of Civil Engineers gave the nation's wastewater infrastructure a grade of D, as poor. The report indicates the nation's wastewater and stormwater systems need an investment of an estimated $298 billion over the next twenty years. In particular, stormwater infrastructure and management are critical areas of concern. Across the nation, local government agencies are finding their stormwater systems are either inadequate or in disrepair. They are under mounting regulatory pressure to upgrade their infrastructure and provide robust stormwater controls. The costs of stormwater programs are increased by land use change and population growth, regulatory requirements (municipal separate storm sewer systems (MS4s), water quality issues (total maximum daily loads, or TMDLs), and flooding concerns. Moreover, setting up a stormwater program is costly, and the conventional method of using the equivalent residential unit (ERU) falls short in adequately addressing stormwater quantity and quality. The solution for most municipalities is to institute stormwater utility fees as a flat number, based on a running average of impermeable surface for a small sample of parcels representing any one jurisdiction.

Managing these stormwater systems and paying for the necessary programs are challenges for many municipalities. Numerous local governments have already formed stormwater utilities (SWU) or agencies that are responsible for enforcing stormwater rate structures and managing stormwater systems, and many other municipalities are considering the institution of a stormwater utility or agency. In the early 1980s, only 20 cities and counties had formed stormwater utilities to help fund the costs of stormwater programs. By 2009, more than 800 communities or districts across the country had adopted a stormwater utility. By 2016, the number had grown to between 1,600 and 2,000 stormwater utilities nationwide.

Stormwater utilities create a dedicated funding source by generating their revenue through user rates. "Use" of the system is the demand a property places on the stormwater system based on the stormwater runoff from the property. Municipalities may attempt to determine rates themselves, or pay for consulting firms up to $100-$300K+ to develop feasibility studies for the SWU fees, credits, and other adequacies.

Currently, there are few alternatives to specifically address setting up stormwater utility fees. Local governments and states need an analytical tool to provide insight for sound decision-making, planning, and implementation of a fee based on Level of Service (LOS).

SUMMARY OF THE INVENTION

Disclosed is a system and method for stormwater utility management that aids stormwater utilities in establishing fees, abatements, and tradeable stormwater credits using publicly available parcel database information. Stormwater utility support services are accessible in a cloud computing environment to stormwater utility computing service computers to allow stormwater utilities to estimate impervious surface area using publicly available data, and from such estimated impervious surface area generate a stormwater utility fee that accurately reflects conditions in the actual subject landscape. Stormwater utility customers also access the stormwater utility support services to review their property information, and to engage with stormwater remediation product and service providers to select, purchase, and implement stormwater remediation measures. By engaging such providers through the stormwater utility support services, the customer's implementation of such mitigating efforts may be tracked by the stormwater utility in real-time, allowing adjustment of that customer's stormwater utility charge through, for example, application of a stormwater credit associated with the particularly implemented mitigation measure.

In accordance with certain aspects of an embodiment of the invention, a computer method is disclosed for generating a per-parcel stormwater utility fee for parcels in a municipality, comprising the steps of: collecting at one or more data storage devices parcel size data for parcels in a municipality from a remote, publicly accessible data source; sending the parcel size data from the one or more data storage devices to a processor; generating by the processor an estimate of municipality average impervious surface area using the parcel size data; generating by the processor a per-parcel stormwater utility fee based on the estimate of municipality average impervious surface area; and displaying the per-parcel stormwater utility fee on a display.

In accordance with further aspects of an embodiment of the invention, a computer system is disclosed for generating a per-parcel stormwater utility fee for parcels in a municipality, comprising: a data storage device collecting parcel size data for parcels in a municipality from a remote, publicly available data source; a processor in data communication with the data storage device, the processor including instructions that when executed cause the processor to: receive the parcel size data from the data storage device; generate an estimate of municipality average impervious surface area using the parcel size data; and generate a per-parcel stormwater utility fee based on the estimate of municipality average impervious surface area; and a display displaying the per-parcel stormwater utility fee.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
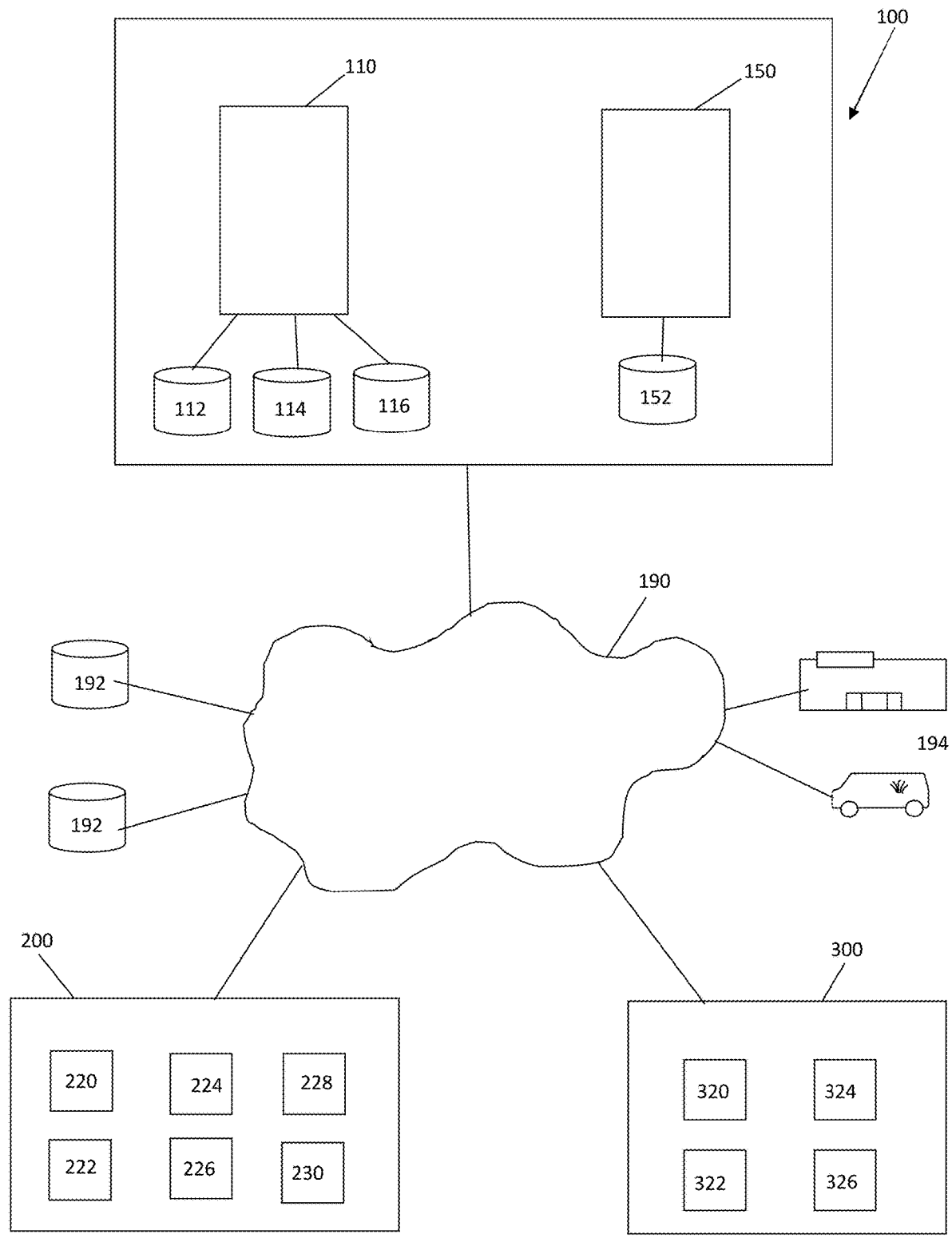
FIG. 1 is a schematic view of a system for stormwater utility management in accordance with certain aspects of an embodiment of the invention.

FIG. 1 shows an exemplary schematic representation of a system for stormwater utility management. A suite of remotely hosted stormwater utility support services 100 is preferably hosted in a cloud computing environment, and is accessible via cloud-based services 190 to end user computing devices 200 and stormwater utility computing devices 300. Stormwater utility support services 100 may include stormwater utility function and data management services 110, and third party stormwater mitigation product and service provider tracking services 150, each of which are discussed in more detail below.

Stormwater utility function and data management services 110 may provide access to publicly available data that describes features of parcels for a particular municipality, which data preferably includes at least lot size of parcels in the municipality. Such data may exist, by way of non-limiting example, in publicly accessible data stores 192. Stormwater utility function and data management services 110 collect data from such publicly accessible data stores 192 to generate data collections, such as database files, comprising tax maps and plat maps 112, resident information, tax, and billing information 114, and impervious surface and other previously determined per-parcel data 116. Optionally, data collections 112, 114, and 116 may be supplemented with additional property-related information relevant to stormwater utility management, when such information is available, and as may be helpful in a particular implementation of the invention.

Moreover, stormwater utility function and data management services 110 implement various functions that allow user computing devices 200 and stormwater utility computing devices 300 to interact with, visualize, and manipulate data in data collections 112, 114, and 116. For example, stormwater utility function and data management services 110 may, as discussed in greater detail below, perform one or more of the following: (i) allow users of stormwater utility computing devices 300, such as employees of a stormwater utility, to generate a stormwater utility fee that is based on estimated size of impervious surfaces on the parcels of a municipality from the publicly available data collected in data collections 112, 114, and 116; (ii) allow users of stormwater utility computing devices 300 to model and determine revenue that may be generated through implementation of the calculated stormwater utility fee that is based on estimated size of impervious surfaces on the parcels of a municipality; (iii) allow users of stormwater utility computing devices 300 to generate, review, and issue stormwater utility fee bills to end users; (iv) allow users of stormwater utility computing devices 300 to monitor activities of end users to remediate stormwater impact (such as through stormwater mitigation solutions, including by way of non-limiting example, changes to vegetation on a parcel, installation of rain barrels, changes to fertilizer applied to a parcel, etc.), and thereby adjust an end user's property profile to issue one or more credits or other adjustments to their stormwater utility fee; (v) allow users of user computing devices 200 to view their property profile including their stormwater utility fee and any applicable credits, to access educational information (such as tools they may use to mitigate stormwater impact), and to access third party stormwater mitigation product and service providing tracking services 150 to select and purchase stormwater mitigation products and services 152 that have been approved by their stormwater utility, the use or installation of which will result in a stormwater credit being issued to that user's account.

Figure 2:
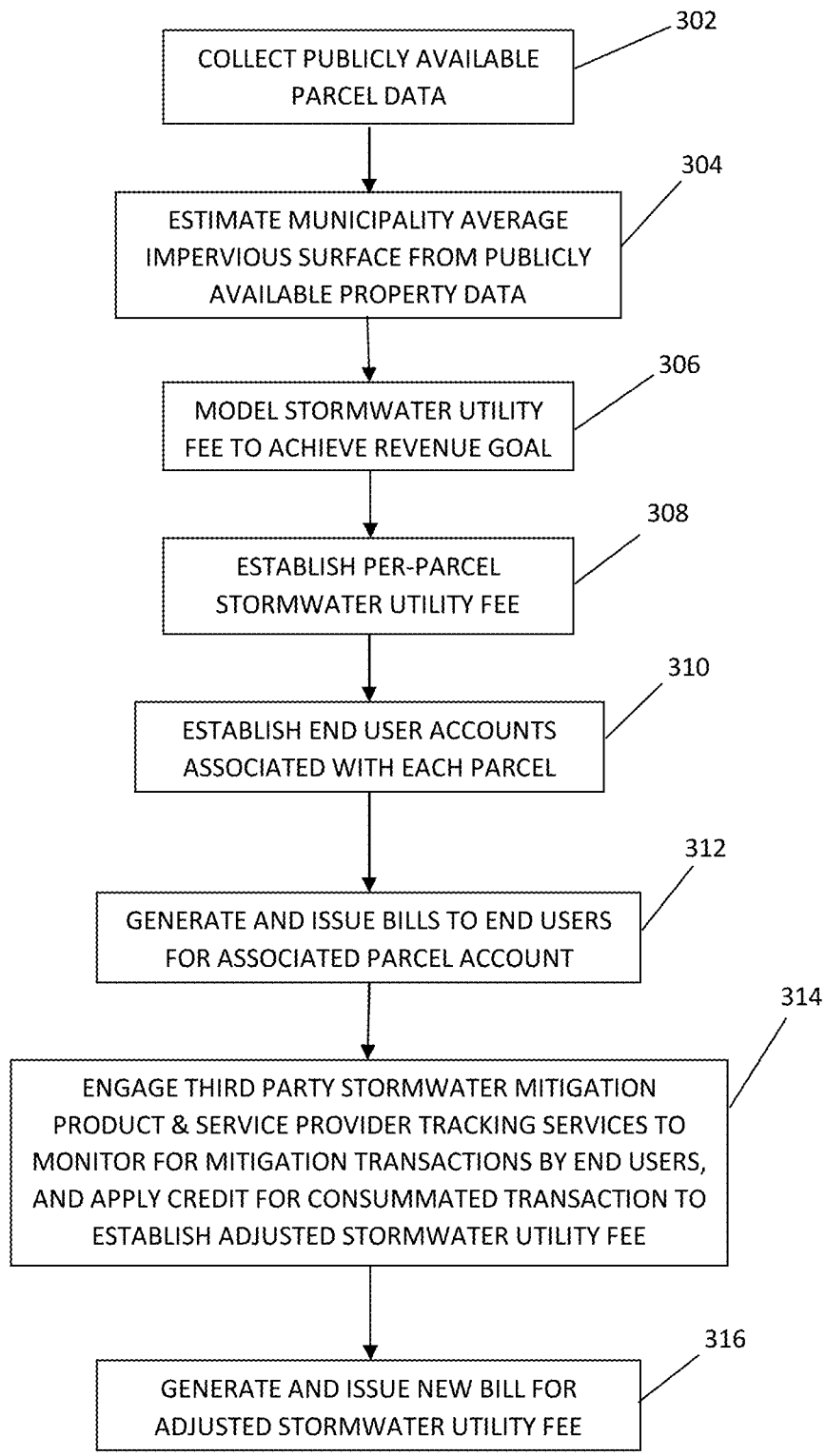
FIG. 2 is a flowchart showing a process that may be engaged by a user of a stormwater utility computing device in the system of FIG. 1.
Figure 3:
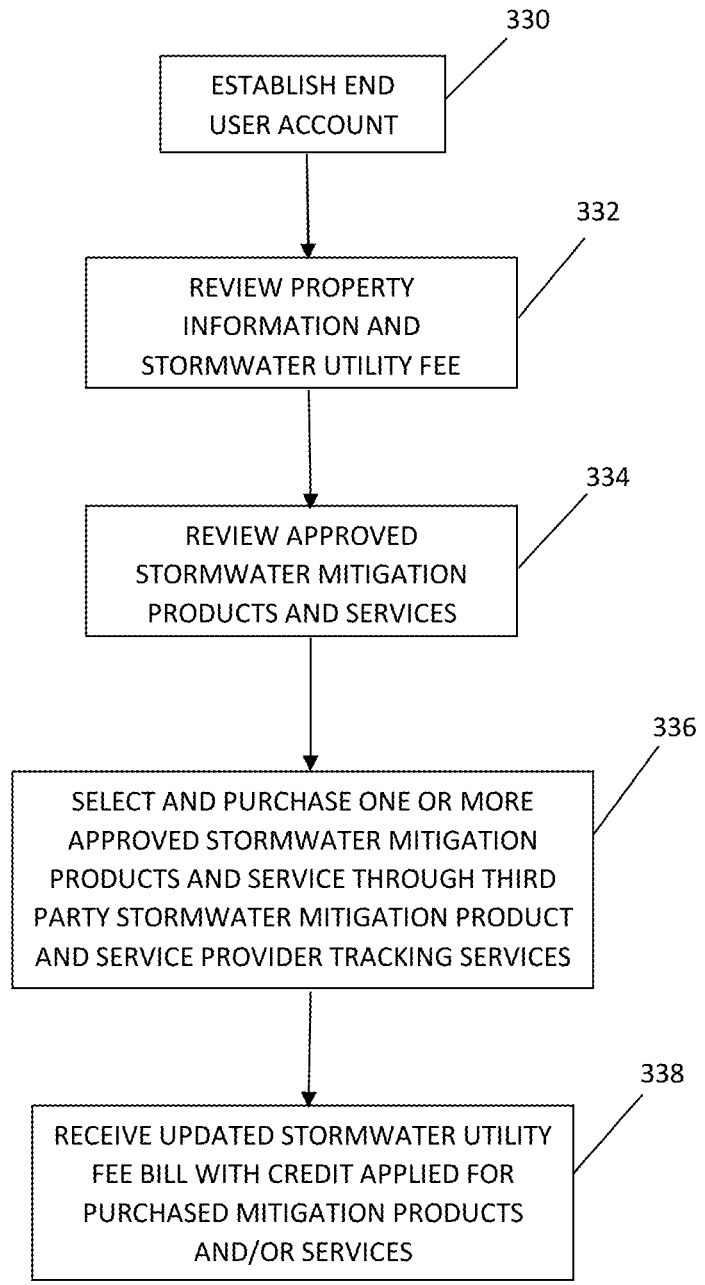
FIG. 3 is a flowchart showing a process that may be engaged by a user of a user computing device in the system of FIG. 1.

FIGS. 2 and 3 are flowcharts illustrating certain features in accordance with an embodiment of the invention.

More particularly, FIG. 2 shows a process that may be engaged by a user of stormwater utility computing device 300. At a preliminary step 302 (and optionally before engagement by stormwater utility computing device 300), stormwater utility support services 100 collects publicly available parcel data for parcels in a municipality from publicly accessible data stores 192, and from at least such publicly accessible data stores populates data collections 112, 114, and 116.

Next, at step 304, a user of stormwater utility computing device 300 engages stormwater utility function and data management services 110 to estimate an average amount of parcel impervious surface for parcels in the municipality from the publicly available property data. Stormwater utility function and data management services 110 may then calculate such average amount of parcel impervious surface, as follows.

First, stormwater utility function and data management services 110 may establish a stormwater unit for each parcel, which stormwater unit may be interpolated based on an associated Curve Number ("CN," which serves as a runoff coefficient) as established by the Soil Conservation Service's ("SCS") publicly available TR-55 standards, which provide published simplified procedures for calculating storm runoff volume, peak rate of discharge, hydrographs, and storage volumes required for floodwater reservoirs. More particularly, the CN of the impervious surface of a residential watershed is a dimensionless number that depends on the hydrologic soil group (HSG), cover type, treatment, hydrologic condition, and antecedent moisture conditions of a parcel. Tables provided by the SCS provide CN values under average antecedent conditions for a given HSG and cover of the soil of a parcel. As is known to those skilled in the art, CN's are used in well-established formulas for computing runoff from rainfall.

Table 1 below provides model parameters from the TR-55 SCS Runoff Method for fully developed urban areas (vegetation established). Table 2 provides an interpolation of the TR-55 data including area (in acres and square feet), impervious surface ("IMP"), and impervious percentage, in order to find the expanded range of CN values.

Fully Developed Urban Areas (Vegetation Established)

TABLE 1

Model parameters from TR-55 SCS Runoff Method

| | Curve numbers for hydrologic soil groups | | | |
|---|---|---|---|---|
| | A | B | C | D |
| Open space (lawns, parks, etc) & Grass/Pasture: | | | | |
| Poor condition (grass cover <50%) | 68 | 79 | 86 | 89 |
| Fair condition (grass cover 50% to 75%) | 49 | 69 | 79 | 84 |
| Good condition (grass cover >75%) | 39 | 61 | 74 | 80 |
| Impervious areas | | | | |
| Paved parking lots, roofs, driveways, etc. | 98 | 98 | 98 | 98 |
| Streets and roads: | | | | |
| Paved: curbs gutters and storm sewers | 98 | 98 | 98 | 98 |
| Paved: open ditches | 83 | 89 | 92 | 93 |
| Gravel | 76 | 85 | 89 | 91 |
| Dirt | 72 | 82 | 87 | 89 |
| Residential | | | | |
| 2 acres | 46 | 65 | 77 | 82 |
| 1 acre | 51 | 68 | 79 | 84 |
| 1/2 acre | 54 | 70 | 80 | 85 |
| 1/3 acre | 57 | 72 | 81 | 86 |
| 1/4 acre | 61 | 75 | 83 | 87 |
| 1/8 acre or less (town houses) | 77 | 85 | 90 | 92 |
| Dirt | 72 | 82 | 87 | 89 |

TABLE 1-continued

Model parameters from TR-55 SCS Runoff Method

| | Curve numbers for hydrologic soil groups | | | |
|---|---|---|---|---|
| | A | B | C | D |
| Urban Districts: | | | | |
| Commercial and business | 89 | 92 | 94 | 95 |
| Industrial | 81 | 88 | 91 | 93 |
| Woods: | | | | |
| Poor | 45 | 66 | 77 | 83 |
| Fair | 36 | 60 | 73 | 79 |

TABLE 2

TR-55 data of area (acres) & (sq. ft.), impervious surface (IMP), and impervious percentage (%) interpolated to find expanded range of values.

| Acre | Sq. Ft. | IMP (Sq. Ft.) | IMP % | A | B | C | D |
|---|---|---|---|---|---|---|---|
| 2.000 | 87120 | 10454.4 | 12 | 46.2 | 65.1 | 77.0 | 82.5 |
| 1.000 | 43560 | 8712 | 20 | 50.9 | 68.1 | 78.9 | 83.9 |
| 0.500 | 21780 | 5445 | 25 | 53.8 | 70.0 | 80.0 | 84.8 |
| 0.333 | 14520 | 4356 | 30 | 56.7 | 71.9 | 81.2 | 85.7 |
| 0.250 | 10890 | 4138.2 | 38 | 61.4 | 74.9 | 83.1 | 87.1 |
| 0.125 | 5445 | 3539.25 | 65 | 77.1 | 85.0 | 89.5 | 91.8 |

Figure 4:
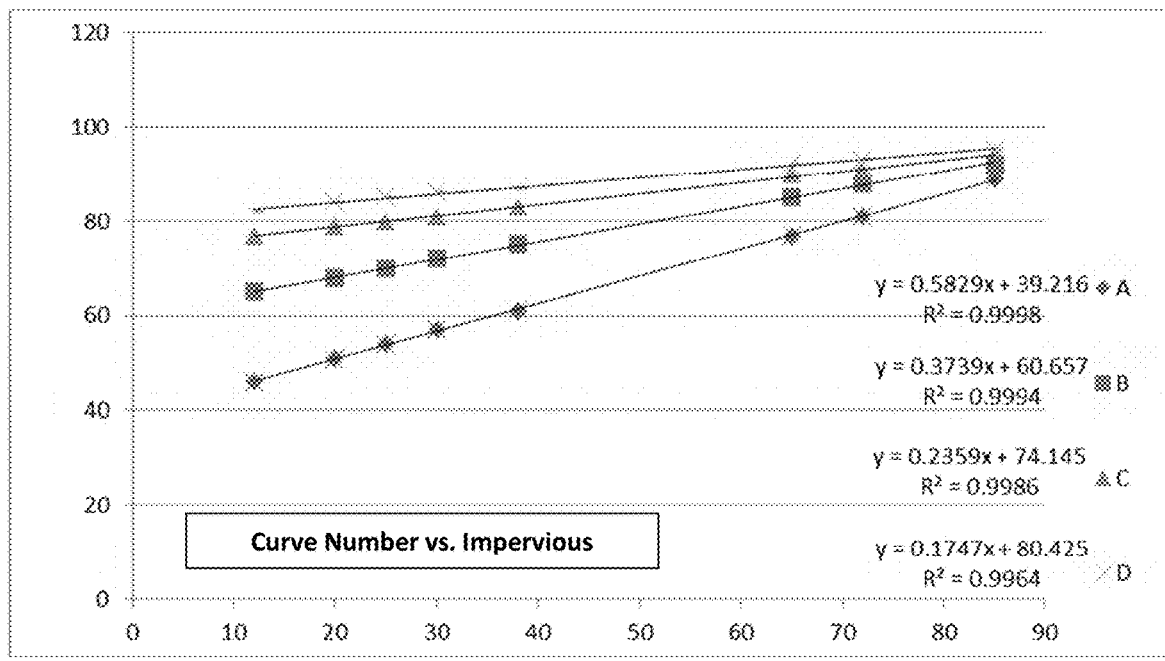
FIG. 4 is a plot showing Curve Number (CN) versus percentage of impervious surface.
Figure 5:
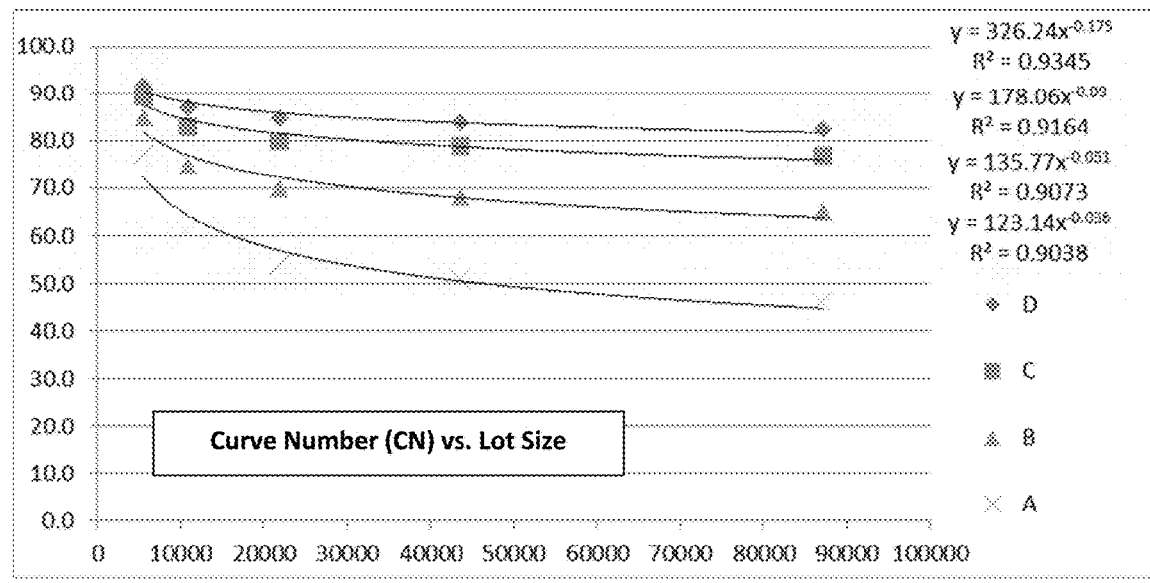
FIG. 5 is a plot showing Curve Number (CN) versus lot size.
Figure 6A:
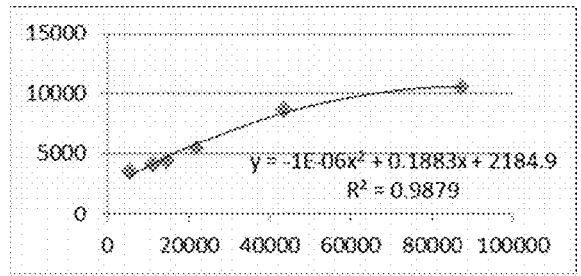
FIGS. 6A, 6B, and 6C are plots showing varied linear regressions of the data reflected in FIG. 4 and FIG. 5.
Figure 6B:
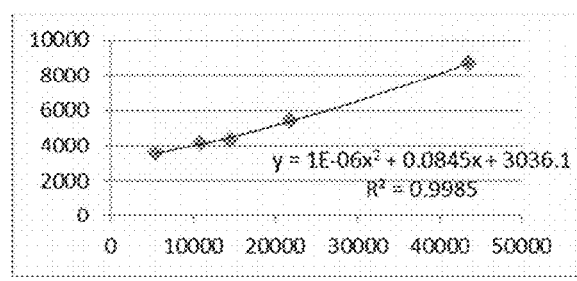
Figure 6C:
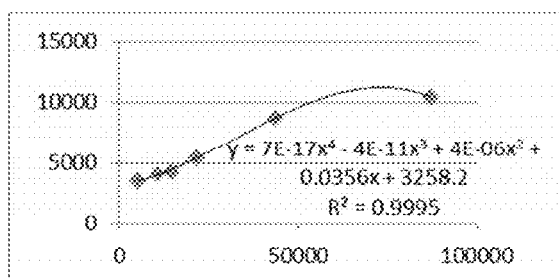

That expanded range of CN values is then used to generate a series of linear plots, as shown in FIG. 4 (showing CN versus percentage of impervious surface) and FIG. 5 (showing CN versus lot size). The plots of FIGS. 4 and 5 are generated to determine correlation of lot size, runoff coefficient (CN), impervious surface area, and soil type (A, B, C, &D as known to those skilled in the art). Those plots are then subjected to linear regression analysis to generate the equations reflected in the graphs of impervious area versus lot size of FIGS. 6A, 6B, and 6C. Those linear regression equations may then be used to determine fees and credits based on the size of a residential lot in the municipality, as indicated in data collections 112, 114, and 116. R-squared values measure the goodness of fit of the TR-55 coefficients and data. Persons skilled in the art may choose which among the equations shown in FIGS. 6A, 6B, and 6C is a best fit for parcels in a given municipality, such as through comparison to historic data, GIS data, or such other verification sources as may occur to those skilled in the art.

With the foregoing data, the stormwater utility may elect to generate a customized stormwater unit equal to the product of the CN and parcel lot size. The resulting stormwater unit thus provides a basis for establishing a stormwater utility fee that is an actual reflection of the activity taking place on the subject landscape (the resulting fee being determined by the stormwater units associated with a parcel times the applicable pricing rate established by the stormwater utility). Optionally, the stormwater units for all parcels in the municipality may be summed, and a user of stormwater utility computing device 300 may model total revenue to be generated by testing hypothetical stormwater utility rates (i.e., by multiplying the total stormwater units for the municipality by the hypothetical rate), and selecting the stormwater utility rate that best meets the stormwater utility's total revenue goal.

Alternatively and again using the foregoing data, the stormwater utility may provide a more simplistic estimate that is conceptually similar to traditional "equivalent residential units" or ERU's, but that importantly is estimated based on the foregoing regression analysis applied to the publicly available lot size data in data collections 112, 114, and 116. Specifically, stormwater utility function and data management services 110 may calculate an estimated ERU for the full municipality by determining an average estimated amount of impervious surface per parcel based on the regression analysis yielding the curves and equations of FIGS. 6A, 6B, and 6C.

Referring again to FIG. 2, a user of stormwater utility computing device 300 may then at step 306 model a stormwater utility fee to achieve the stormwater utility's total revenue goal. As mentioned above, such modelling may be achieved by multiplying total stormwater units for subject parcels in the municipality by a hypothetical rate to achieve a total revenue goal and then set the rate at the point where such total revenue goal is achieved, and by comparing such rate to the estimated ERU that has been calculated as described above. Next, at step 308, the user of stormwater utility computing device 300 may establish the per-parcel stormwater utility fee by selecting from the optimized stormwater rate through analysis of municipality stormwater units or the estimated ERU.

With the per-parcel stormwater utility rate established, the user of stormwater utility computing device 300 may then at step 310 engage stormwater utility function and data management services 110 to establish accounts of end users that are associated with each subject parcel in the municipality. After such accounts are established, the user of stormwater utility computing device 300 may at step 312 generate and issue bills to end users for their associated parcel account. Thereafter, at step 314, the user of stormwater utility computing device may engage third party stormwater mitigation product and service provider tracking services 150 to monitor for mitigation transactions between end users of user computing devices 200 and mitigation product and service providers 194 (e.g., stores that may provide stormwater mitigation products (e.g., rain barrels, disconnection devices, trees, plants, etc.) and related services, such as LOWES, HOME DEPOT, WAL-MART, etc., lawn service providers such as TRUGREEN, LAWN DOCTOR, etc., and landscape management services providers that may provide construction, inspection, and maintenance for stormwater best management practices) and apply a credit for consummated mitigation transactions to establish an adjusted stormwater utility fee for the associated parcel account. Optionally, stormwater mitigation product and service provider tracking services 150 may also monitor for changes in applications of harmful products that may negatively impact stormwater (e.g., nitrogen and phosphorous, fertilizers, etc.) by third party providers of such products, and similarly apply credits upon detection of a transaction that mitigates the negative impact of such harmful products. Finally, at step 316, the stormwater utility computing device 300 may generate and issue a new bill for the adjusted stormwater utility fee.

Referring again to FIG. 1, stormwater utility computing device 300 preferably provides a user interface that includes web pages served by stormwater utility support services 100, which web pages in turn serve various applications and functions to the user of stormwater utility computing device 300. Those applications and functions may include, by way of non-limiting example, a view/update properties page 320 that allows a user to view and update the data in individual parcel records, a reports page 322 that allows a user to generate and view reports of individual parcel data, a chat and customer service page 324 that allows a user to engage in customer service interactions with end users, and a manage customer accounts page 326 that allows a user to enter and edit information specific to a particular user's account and process payments and credits on such account.

Referring to FIG. 3, a process is shown that may be engaged by a user of user computing device 200. At step 330, a user of user computing device 200 may establish an end user account. At step 332, a user of user computing device 200 may review the property information and stormwater utility fee associated with their end user account. At step 334, a user of user computing device 200 may review approved stormwater mitigation products and services 152 available from approved stormwater products and services providers 194, and at step 336 the user may select and purchase one or more approved stormwater mitigation products and services 152 through third party stormwater mitigation product and service provider tracking services 152. More particularly, stormwater mitigation product and service provider tracking services 152 may provide an e-commerce portal through which a user of user computing device 200 may communicate with the online ordering infrastructure of approved stormwater products and services providers 194 (which infrastructure may take any form of e-commerce service know existing or as may be provided in the future) to consummate a purchase transaction, with stormwater mitigation product and service provider tracking services 152 recording such transaction on that user's parcel account. In response to detecting such a purchase and as discussed above, the stormwater utility may then adjust the user's parcel account to reflect a stormwater mitigation credit for the mitigation product or service purchased by the user. Finally, at step 336 the user of user computing device 200 may receive an updated stormwater utility fee bill with a credit applied for the purchased mitigation products and/or services.

Referring once again to FIG. 1, user computing device 200 preferably provides a user interface that includes web pages served by stormwater utility support services 100, which web pages in turn serve various applications and functions to the user of user computing device 200. Those applications and functions may include, by way of non-limiting example, a view property page 220 that allows the user to view their individual parcel record maintained by the stormwater utility; a bill, forms, and feedback page 222 that allows the user to view and pay their stormwater utility bill, obtain forms necessary for creation and maintenance of their account, and provide and receive feedback on issues relating to their account; a chat/customer service page 224 that allows the user to interact online with customer service representatives of the stormwater utility; a tutorials/education page 226 that allows the user to obtain access to documents, videos, and/or other media having educational information about stormwater management and mitigation techniques; a shop product and service providers page 228 allowing the user to engage third party stormwater mitigation product and service provider tracking services 150 to shop for and ultimately purchase a mitigation product or service; and a downloads page 230 allowing the user to download relevant documents from their stormwater utility.

As will be apparent to those of ordinary skill in the art, each user interface of user computing device 200 and stormwater utility computing device 300 may include a login screen that prompts the associated user for a username and password, and such other authenticating data as may be deemed appropriate to a given installation.

The method and system as described above provide an integrated, computer-implemented data analysis and communication platform among diverse entities of stormwater utilities, owners of parcels within the municipality of those stormwater utilities, and third party stormwater mitigation product and service suppliers that allows real-time modeling of changes to parcels (e.g., through stormwater mitigation solutions) that would modify the estimation of a parcel's impervious surfaces and thus their associated stormwater utility fees, and ordering of products or services from third parties that would reduce their stormwater runoff, while simultaneously alerting the stormwater utilities that a property change has occurred. Such alert, in turn, allows real-time adjustment of that parcel's stormwater utility fee calculation, along with adjustment of their bill. Even further, the method and system provide such real-time data analysis and monitoring through automated processes for estimating impervious surfaces through publicly available parcel data, thus streamlining the establishment of per-parcel stormwater utility fees while ensuring that such fees are established based on activity that actually occurs on the subject landscape.

Figure 7:
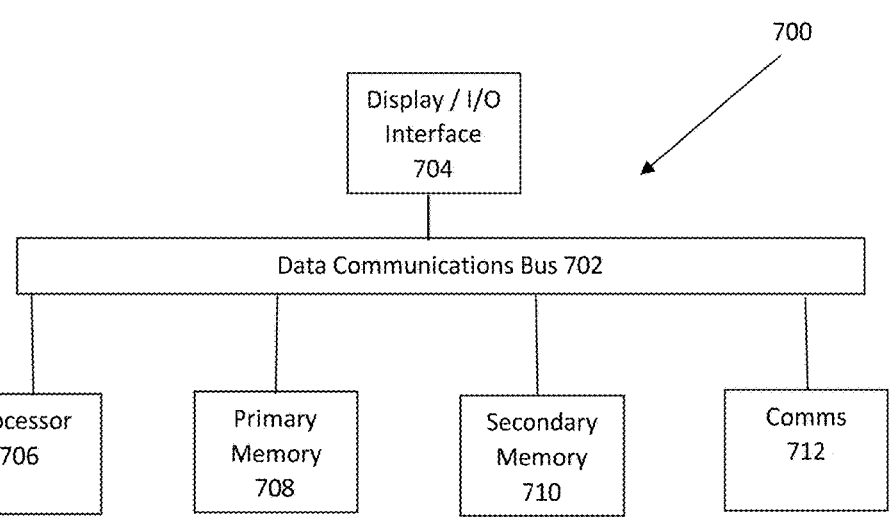
FIG. 7 shows a schematic view of an exemplary computer system suitable for implementing the methods described herein.

FIG. 7 shows an exemplary computer system 700 suitable for implementing the methods described herein. Those skilled in the art will recognize that each of user computing device 200, stormwater utility computing device 300, and one or more computers implementing stormwater utility support services 100 may each take the form of computer system 700 as reflected in FIG. 7, though variations thereof may readily be implemented by persons skilled in the art as may be desirable for any particular installation. In each such case, one or more computer systems 700 may carry out the foregoing methods as computer code.

Computer system 700 includes a communications bus 702, or other communications infrastructure, which communicates data to other elements of computer system 700. For example, communications bus 702 may communicate data (e.g., text, graphics, video, other data) between bus 702 and an I/O interface 704, which may include a display, a data entry device such as a keyboard, touch screen, mouse, or the like, and any other peripheral devices capable of entering and/or viewing data as may be apparent to those skilled in the art. Further, computer system 700 includes a processor 706, which may comprise a special purpose or a general purpose digital signal processor. Still further, computer system 700 includes a primary memory 708, which may include by way of non-limiting example random access memory ("RAM"), read-only memory ("ROM"), one or more mass storage devices, or any combination of tangible, non-transitory memory. Still further, computer system 700 includes a secondary memory 710, which may comprise a hard disk, a removable data storage unit, or any combination of tangible, non-transitory memory. Finally, computer system 700 may include a communications interface 712, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 708, secondary memory 710, communications interface 712, and combinations of the foregoing may function as a computer usable storage medium or computer readable storage medium to store and/or access computer software including computer instructions. For example, computer programs or other instructions may be loaded into the computer system 700 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory 710, or through data communication bus 702 to primary memory 708.

Communication interface 712 allows software, instructions and data to be transferred between the computer system 700 and external devices or external networks. Software, instructions, and/or data transferred by the communication interface 712 are typically in the form of signals that may be electronic, electromagnetic, optical or other signals capable of being sent and received by communication interface 712. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow processor 706 of computer system 700 to implement the methods discussed herein for stormwater utility management according to computer software including instructions.

Computer system 700 may perform any one of, or any combination of, the steps of any of the methods described herein. It is also contemplated that the methods according to the present invention may be performed automatically, or may be accomplished by some form of manual intervention.

The computer system 700 of FIG. 7 is provided only for purposes of illustration, such that the invention is not limited to this specific embodiment. Persons having ordinary skill in the art are capable of programming and implementing the instant invention using any computer system.

Further, computer system 700 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand held console, an MP3 player, or other similarly configured small-size, portable computing device as may occur to those skilled in the art.

As explained above, the system of FIG. 1 may, in an exemplary configuration, be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one of user computing device 200 and/or stormwater utility computing device 300 operating as a client computer. The client computer may be any device that may be used to access a distributed computing environment to perform the methods disclosed herein, and may include (by way of non-limiting example) a desktop computer, a portable computer, a mobile phone, a personal digital assistant, a tablet computer, or any similarly configured computing device. That client computer preferably includes memory such as RAM, ROM, one or more mass storage devices, or any combination of the foregoing. The memory functions as a computer readable storage medium to store and/or access computer software and/or instructions.

That client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one more servers via, for example, the Internet, to in turn establish communication with one or more cloud data centers that implement stormwater utility support services 100. A cloud data center may include one or more networks that are managed through a cloud management system. Each such network includes resource servers that permit access to a collection of computing resources and components of stormwater utility support services 100, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof.

The cloud computing environment described above is provided only for purposes of illustration and does not limit the invention to this specific embodiment. It will be appreciated that those skilled in the art are readily able to program and implement the invention using any computer system or network architecture.

Figure 8:
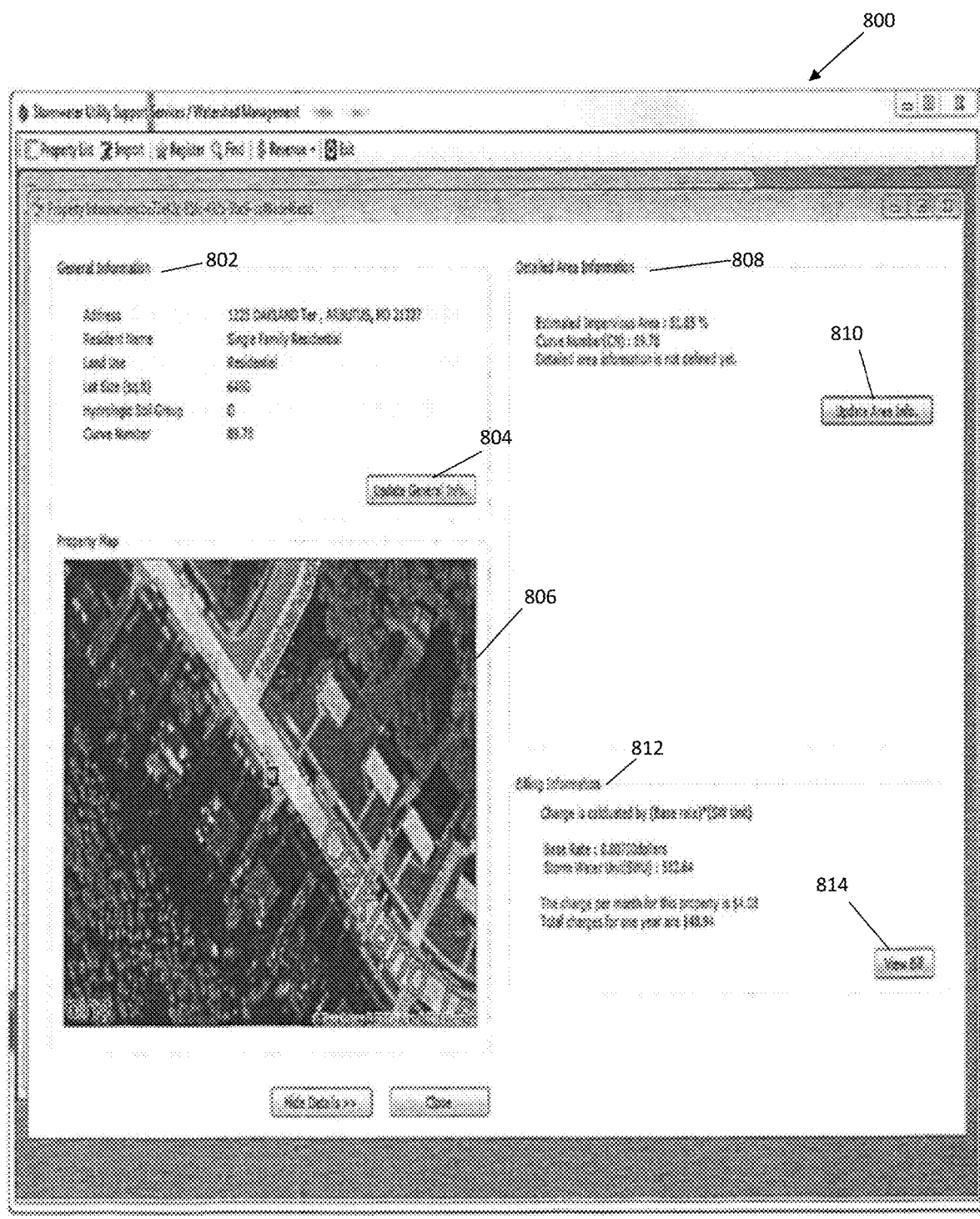
FIG. 8 shows an exemplary parcel record screen that may be presented by stormwater utility function data management services to a user of a stormwater utility computing device of the system of FIG. 1.

FIG. 8 is an exemplary parcel record screen 800 that may be presented to a user of stormwater utility computing device 300 by stormwater utility function and data management services 110. Parcel record screen 800 may include general information 802 that preferably includes: (i) address, (ii) resident name, (iii) land use type, (iv) lot size, (v) hydrologic soil group, and (vi) Curve Number (CN) applicable to the parcel. Preferably, a user of stormwater utility computing device 300 may engage an "Update General Info" function 804 to modify the general information 802 in the event that any of such general information changes. Alternatively, updates may be applied automatically upon, for instance, regularly scheduled updates of data stores 112, 114, and 116 from publicly accessible data stores 192. Parcel record screen 800 may also include a property map 806 depicting, for example, an aerial image of the subject parcel (although traditional map-view images may likewise be displayed).

Parcel record screen 800 also preferably includes detailed area information 808, which detailed area information 808 preferably includes: (i) estimated impervious area calculated as described above, and (ii) CN. Preferably, a user may engage an "Update Area Info" function 810 to modify the detailed area information 808 in the event that any such detailed area information changes. Alternatively, updates may be applied automatically upon, for instance, regularly scheduled updates of data stores 112, 114, and 116 from publicly accessible data stores 192.

Still further, parcel record screen 800 also preferably includes billing information 812 which reflects (i) the base stormwater utility fee rate that is applied to the subject parcel, (ii) the calculated stormwater units for the parcel, and (iii) the associated charges (e.g., per month and per year) for the subject parcel based on the rate and the stormwater units. Optionally, a user may engage a "View Bill" function 814 to view the stormwater utility fee bill for the property, and to optionally approve and transmit the bill to the associated parcel account.

Figure 9:
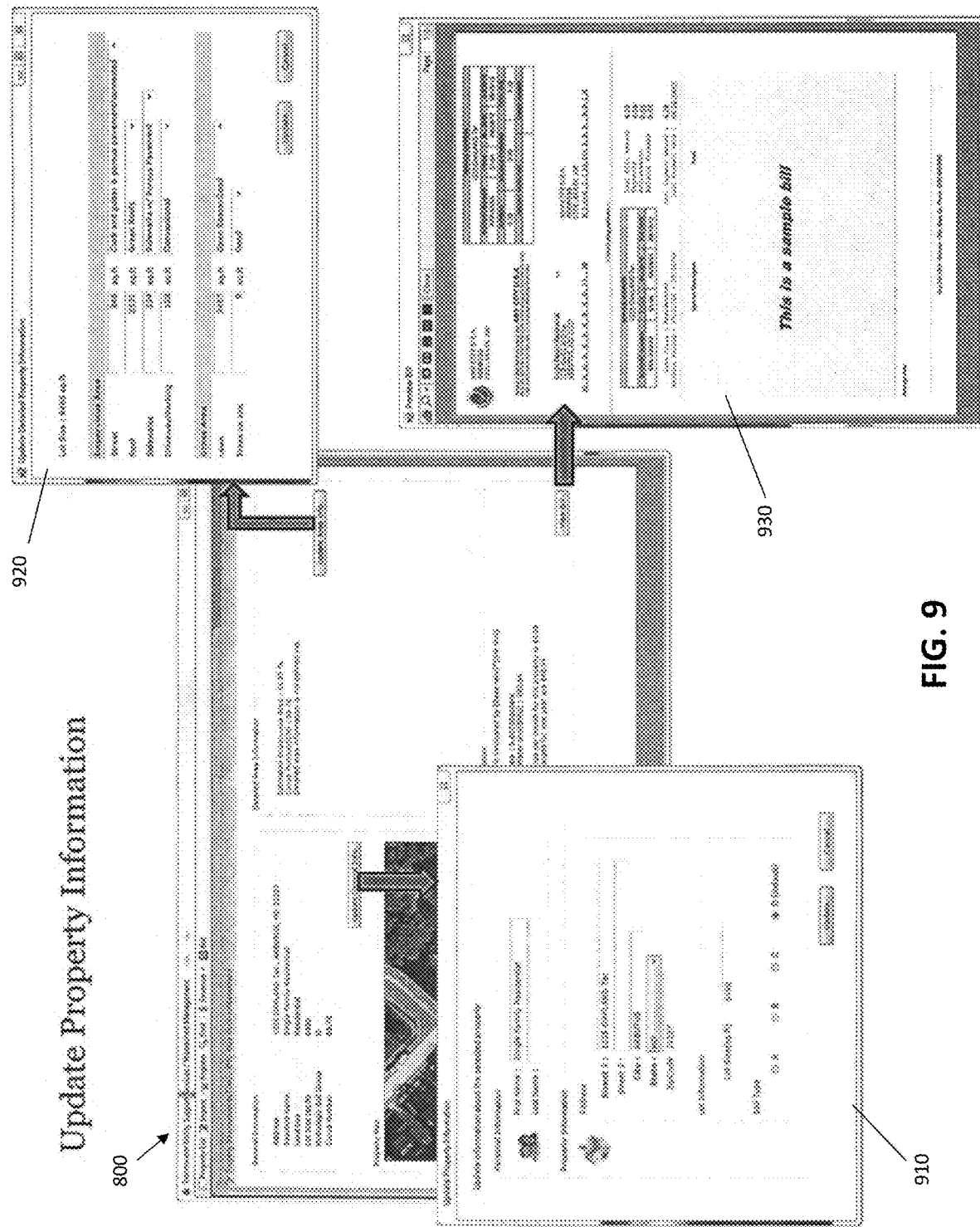
FIG. 9 shows exemplary parcel record update screens and a view bill window that may be presented by stormwater utility function data management services to a user of a stormwater utility computing device of the system of FIG. 1.

FIG. 9 shows exemplary parcel record update screens 910 and 920, and a view bill window 930. Update screen 910 may be presented by stormwater utility function data management services 110 to stormwater utility computing device 300 in response to a user engaging "Update General Info" function 804, and allows a user to update the associated parcel account owner's name, address, lot size, and soil type. Likewise, update screen 920 may be presented by stormwater utility function data management services 110 to stormwater utility computing device 300 in response to a user engaging "Update Area Info" function 810, and allows a user to update impervious area and gross area associated with the subject parcel. Finally, view bill window 930 may be presented by stormwater utility function data management services 110 to stormwater utility computing device 300 in response to a user engaging "View Bill" function 814.

All of the foregoing functions are preferably made accessible to a user of stormwater utility computing service 300 by stormwater utility function and data management services 110 through the user engaging view/update properties page 320 on stormwater utility computing device 300.

Figure 10:
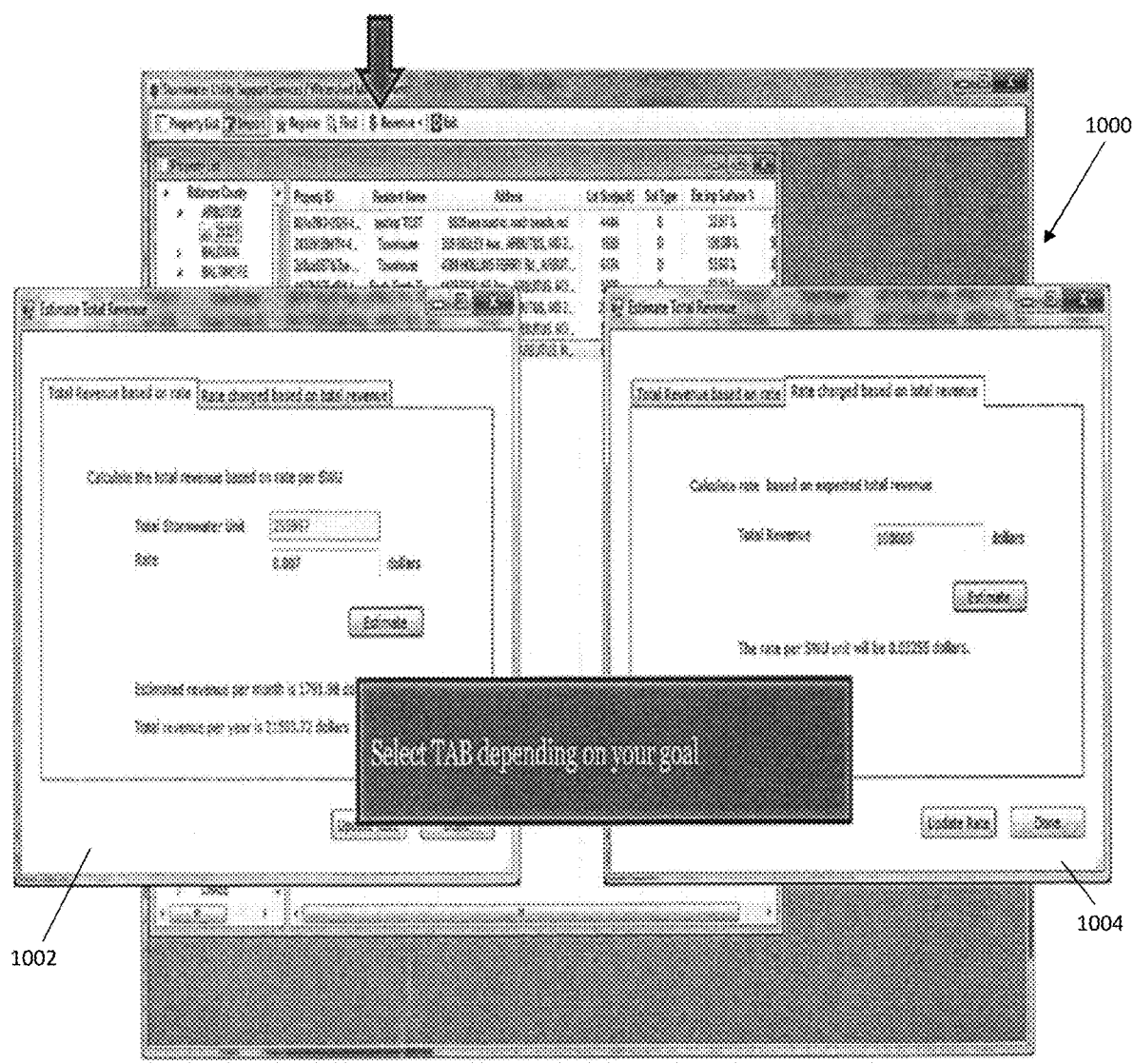
FIG. 10 shows an exemplary Revenue Estimation screen that may be presented by stormwater utility function data management services to a user of a stormwater utility computing device of the system of FIG. 1.

FIG. 10 shows an exemplary Revenue Estimation screen 1000 that may be presented by stormwater utility function data management services 110 to stormwater utility computing device 300 to allow the stormwater utility to analyze revenue hypotheticals for a municipality based on the calculated SWUs for the subject parcels in that municipality. More particularly, stormwater utility function and data management services 110 may provide stormwater utility computing device 300 a first Total Revenue Based on Rate screen 1002 that allows the user to enter an exemplary stormwater utility rate to review total revenue that will be generated for the municipality based upon the calculated SWUs for that municipality, and a Rate Charged Based on Total Revenue screen 1004 that allows the user to enter a desired total revenue to review the stormwater utility fee rate that must be charged based upon the calculated SWUs for that municipality.

Figure 11:
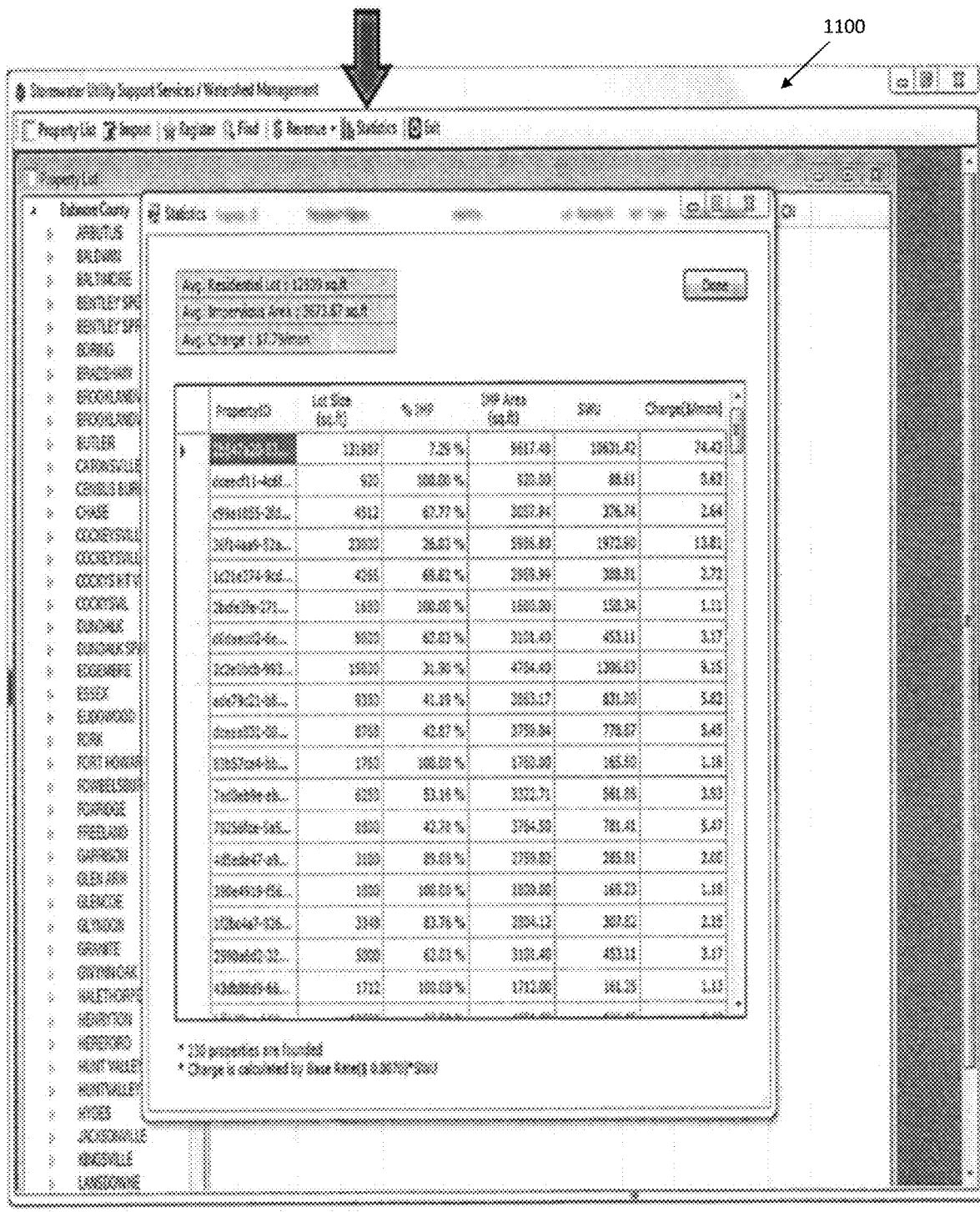
FIG. 11 shows an exemplary Statistics screen that may be presented by stormwater utility function data management services to a user of a stormwater utility computing device of the system of FIG. 1.

FIG. 11 shows an exemplary Statistics screen 1100 that may be presented by stormwater utility function data management services 110 to stormwater utility computing device 300 to allow the stormwater utility to analyze stormwater utility fee statistics for their municipatility, including an average residential lot size, and average impervious surface area per lot, and an average stormwater utility fee charge per lot.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A method for automatically modifying per-parcel stormwater utility fees for parcels in a municipality, comprising the steps of:

collecting, at one or more data storage devices, parcel record data for parcels in a municipality from a remote, publicly accessible data source, wherein the parcel record data comprises a lot size, a location, a land use type, a hydrologic soil group, a Curve Number, a property map, billing information, and parcel change data including historical impervious surface area data for each of the parcels;

sending said parcel record data from said one or more data storage devices to a processor;

generating, by the processor, a real-time model of the parcels in the municipality, wherein an output of the real-time model is an estimate of municipality average impervious surface area using said parcel record data by:

determining, by the processor, an initial Curve Number for each parcel of a plurality of parcels in said parcel record data;

determining, by the processor, an expanded range of Curve Number values for said plurality of parcels in said parcel record data by interpolating parcel area, impervious surface area, and impervious percentage of said initial Curve Numbers;

determining, by the processor, a relationship of Curve Number to lot size for said plurality of parcels;

performing, by the processor, linear regression analysis of data indicating said relationship of Curve Number to lot size for said plurality of parcels; and establishing, by the processor, a customized stormwater unit equal to a product of the Curve Number and the lot size for said plurality of parcels;

generating, by the processor, a per-parcel stormwater utility fee based on the estimate of municipality average impervious surface area by:

summing, by the processor, established, customized stormwater units for each parcel of said plurality of parcels; and dividing, by the processor, a total target revenue by said sum of the established, customized stormwater units for said plurality of parcels;

transmitting, from said processor to a remote stormwater utility computing device,. an interactive electronic page, and engaging said remote stormwater utility computing device through said interactive electronic page with said processor to calculate at least one of (i) a total stormwater utility fee revenue based on a total number of stormwater units for the parcels in said municipality and an established rate, and (ii) a rate based on said total number of stormwater units for the parcels in said municipality and a target total stormwater utility fee revenue, wherein the interactive electronic page displays an aerial image associated with the product map of at least one parcel of the plurality of parcels;

monitoring, by said processor, a computer associated with the at least one parcel of the plurality of parcels, to detect implementation by said computer associated with the at least one parcel of the plurality of parcels of a stormwater mitigation product, wherein the implementation is detected by monitoring for at least one of a completed mitigation transaction by a remote third-party provider of the stormwater mitigation product, a change in an application of a stormwater-impacting product, or a change to the aerial image; and upon detection of the implementation by said computer associated with the at least one parcel of the plurality of parcels of a stormwater mitigation product:

causing said remote stormwater utility computing device to request updated parcel record data;

modifying, by the processor, the real-time model;

updating, by the processor, the estimate of municipality average impervious surface area; and automatically generating, at said processor, an updated per-parcel stormwater utility fee associated with the at least one parcel of the plurality of parcels.

2. A computer system for generating a per-parcel stormwater utility fee for parcels in a municipality, comprising:

a data storage device collecting parcel record data for parcels in a municipality from a remote, publicly available data source, wherein the parcel record data comprises a lot size, a location, a land use type, a hydrologic soil group, a Curve Number, a property map, billing information, and parcel change data including historical impervious surface area data for each of the parcels;

a processor in data communication with said data storage device, the processor including instructions that when executed cause the processor to:

receive said parcel record data from said data storage device;

generate a real-time model of the parcels in the municipality, wherein an output of the real-time model is an estimate of municipality average impervious surface area using said parcel record data by:

determining, by the processor, an initial Curve Number for each parcel of a plurality of parcels in said parcel size record data;

determining, by the processor, an expanded range of Curve Number values for said plurality of parcels in said parcel record data by interpolating parcel area, impervious surface area, and impervious percentage of said initial Curve Numbers;

determining, by the processor, a relationship of Curve Number to lot size for said plurality of parcels;
performing, by the processor, linear regression analysis of data indicating said relationship of Curve Number to lot size for said plurality of parcels; and
establishing, by the processor, a customized stormwater unit equal to a product of the Curve Number and the lot size for said plurality of parcels;
generate a per-parcel stormwater utility fee based on the estimate of municipality average impervious surface area by:
summing, by the processor, established, customized stormwater units for each parcel of said plurality of parcels; and
dividing, by the processor, a total target revenue by said sum of the established, customized stormwater units for said plurality of parcels;
transmit from said processor to a remote stormwater utility computing device, an interactive electronic page, and engage said remote stormwater utility computing device through said interactive electronic page with said processor to calculate at least one of (i) a total stormwater utility fee revenue based on a total number of stormwater units for the parcels in said municipality and an established rate, and (ii) a rate based on said total number of stormwater units for the parcels in said municipality and a target total stormwater utility fee revenue, wherein the interactive electronic page displays an aerial image associated with the product map of at least one parcel of the plurality of parcels;
monitor, at said processor, a computer associated with the at least one parcel of the plurality of parcels, to detect implementation by said computer associated with the at least one parcel of the plurality of parcels of a stormwater mitigation product; and
upon detection of the implementation by said computer associated with the at least one parcel of the plurality of parcels of a stormwater mitigation product:
cause said remote stormwater utility computing device to request updated parcel record data;
modify, by the processor, the real-time model;
update, by the processor, the estimate of municipality average impervious surface area; and
automatically generate, at said processor, an updated per-parcel stormwater utility fee associated with the at least one parcel of the plurality of parcels.

\* \* \* \* \*